US010634843B2

(12) United States Patent
Bayn et al.

(10) Patent No.: US 10,634,843 B2
(45) Date of Patent: Apr. 28, 2020

(54) PHOTONIC INTEGRATED CIRCUIT WITH LASER AND ISOLATOR (71) Applicant: APPLE INC., Cupertino, CA (US)

(72) Inventors: Igal I. Bayn, New York, NY (US); Andrew J. Sutton, Sunnyvale, CA (US); Alexander Shpunt, Portola Valley, CA (US); Jason S. Pelc, Sunnyvale, CA (US); Mark A. Arbore, Los Altos, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/271,833

(22) Filed: Feb. 10, 2019

(65) Prior Publication Data
US 2019/0324203 A1    Oct. 24, 2019

Related U.S. Application Data (60) Provisional application No. 62/756,608, filed on Nov. 7, 2018, provisional application No. 62/661,659, filed on Apr. 24, 2018.

(51) Int. Cl.
*G02B 6/12*    (2006.01)
*G02B 6/13*    (2006.01)
*G02B 6/122*   (2006.01)

(52) U.S. Cl.
CPC ....... *G02B 6/12004* (2013.01); *G02B 6/1228* (2013.01); *G02B 6/13* (2013.01); *G02B 2006/12061* (2013.01); *G02B 2006/12116* (2013.01); *G02B 2006/12121* (2013.01); *G02B 2006/12157* (2013.01)

(58) Field of Classification Search
CPC combination set(s) only.
See application file for complete search history.

(56) References Cited

U.S. PATENT DOCUMENTS

| 5,513,196 | A  | * | 4/1996  | Bischel | ............... | H01S 5/141 |
|           |    |   |         |         |                 | 372/102    |
| 8,168,939 | B2 | * | 5/2012  | Mack    | ............... | H04B 10/503 |
|           |    |   |         |         |                 | 250/225    |
| 2012/0280344 | A1 | * | 11/2012 | Shastri | ............... | G02B 6/426 |
|           |    |   |         |         |                 | 257/432    |
| 2014/0010509 | A1 | * | 1/2014  | Zayets  | ............... | G02B 6/10  |
|           |    |   |         |         |                 | 385/131    |

(Continued)

FOREIGN PATENT DOCUMENTS

GB         2391952 A   *   2/2004   ......... G02B 6/29368

OTHER PUBLICATIONS

Merritt., "DesignCon: Cisco packs silicon photonics on 3-D ICs", EDN Network, pp. 1-2, Jan. 28, 2013.

(Continued)

*Primary Examiner* — Sung H Pak
(74) *Attorney, Agent, or Firm* — Kligler & Associates Patent Attorneys Ltd (57) ABSTRACT An optoelectronic device includes a substrate, having a recess formed therein. An optical isolator is mounted in the recess. A laser includes a stack of epitaxial layers on the substrate and emits a beam of radiation toward the recess along a direction parallel to a surface of the substrate. A waveguide directs the beam emitted by the laser into the optical isolator.

20 Claims, 8 Drawing Sheets (56) References Cited

U.S. PATENT DOCUMENTS

| | | | |
|---|---|---|---|
| 2015/0185426 A1* | 7/2015 | Miao | G02F 1/093 |
| | | | 385/33 |
| 2016/0195737 A1* | 7/2016 | Nakamura | G02B 27/286 |
| | | | 359/484.03 |
| 2017/0237516 A1* | 8/2017 | Welch | H04J 14/02 |
| | | | 398/79 |
| 2017/0269395 A1* | 9/2017 | Heck | G02B 6/12004 |

OTHER PUBLICATIONS

Peter De Dobbelaere-Luxtera., "Light source approach for silicon photonics transceivers", pp. 1-12, Sep. 30, 2014.
Deltronic Crystal Industries, Inc., "Free-Space Optical Isolator and Faraday Rotator Product Line", pp. 1-4, year 2012.

* cited by examiner

PHOTONIC INTEGRATED CIRCUIT WITH LASER AND ISOLATOR

CROSS-REFERENCE TO RELATED APPLICATIONS

This application claims the benefit of U.S. Provisional Patent Application 62/661,659, filed Apr. 24, 2018, and of U.S. Provisional Patent Application 62/756,608, filed Nov. 7, 2018. Both of these related applications are incorporated herein by reference.

FIELD OF THE INVENTION

The present invention relates generally to optoelectronic devices, and particularly to integrated photonic devices and methods for their fabrication.

BACKGROUND

Photonic integrated circuits (PICs) integrate multiple optical and optoelectronic functions in a single device, fabricated on a semiconductor substrate. These functions include both passive routing elements, such as waveguides, splitters, couplers and resonators; and active elements, such as tuners, modulators and detectors, as well as lasers. Some PICs incorporating lasers that are currently known in the art are fully implemented on III-V substrate, resulting in low-yield and high cost. Other PICs are made on silicon substrates using CMOS-compatible processes and are then integrated with a separately-fabricated laser (III-V) and isolator components, usually on an optical interposer. This latter approach allows utilization of the large-scale production, low cost and high yield that Si-photonics inherit from CMOS processing, but suffers from difficult, costly assembly based on "pick and place" tools. Recently, however, a number of foundries have developed the capability of integrating III-V laser dies on SOI (silicon on insulator) wafers, together with silicon-based waveguides and other optical and electro-optical components.

Optical isolators are commonly used in laser-based optical systems to prevent unwanted feedback into the laser cavity caused by back reflections from other system components. Components providing optical isolation are necessarily non-reciprocal to ensure that the laser can be protected from backwards-propagating optical fields while allowing the passage of forward-direction fields. The most common type of optical isolator is based on a Faraday rotator, which uses the magneto-optic effect to rotate the polarization of incident light. Optical isolators of this sort are generally referred to as Faraday isolators. Typically, the operating parameters of the Faraday rotator (choice of magneto-optic material, length, and magnetic field strength) are chosen to rotate the polarization by ±45° depending upon the direction of travel. Light enters the Faraday rotator through an input polarizer and exits through an output polarizer, which is rotated by 45° relative to the input. Any backward-propagating light that passes back through the output polarizer (in the opposite direction) will have its polarization counter-rotated by 45° by the Faraday rotator and will thus be blocked by the input polarizer. Faraday rotation can also be applied to unpolarized light, typically utilizing birefringent crystals to spatially separate polarization components.

SUMMARY

Embodiments of the present invention that are described hereinbelow provide improved integrated photonic devices and methods for producing such devices.

There is therefore provided, in accordance with an embodiment of the invention, an optoelectronic device, including a substrate, having a recess formed therein. An optical isolator is mounted in the recess. A laser, including a stack of epitaxial layers on the substrate, is configured to emit a beam of radiation toward the recess along a direction parallel to a surface of the substrate. A waveguide is configured to direct the beam emitted by the laser into the optical isolator.

In some embodiments, the waveguide has an entrance in proximity to the laser and an exit in proximity to the recess and is tapered along a direction of the beam between the entrance and the exit. In one embodiment, the exit of the waveguide is smaller than the entrance and has a transverse dimension that is less than a wavelength of the radiation emitted by the laser. Additionally or alternatively, a transverse dimension of the waveguide widens adiabatically from the entrance to the exit. Further additionally or alternatively, the waveguide is tapered in both a horizontal dimension, parallel to the surface of the substrate, and in a vertical dimension, perpendicular to the surface of the substrate.

Typically, there is no lens between the laser and the optical isolator.

In a disclosed embodiment, the optical isolator includes an input face, which is positioned to receive the beam from the waveguide, and an output face, through which the beam exits the optical isolator, and the device includes one or more further photonic components on the substrate and a further waveguide configured to guide the beam from the output face of the optical isolator toward the one or more further photonic components. Additionally or alternatively, there is no lens between the optical isolator and the further photonic components.

In some embodiments, the optical isolator includes a bulk Faraday rotator. In a disclosed embodiment, the optical isolator includes an input polarizer positioned to receive the beam from the waveguide, and an output polarizer, which has a direction of polarization that is rotated relative to the input polarizer and through which the beam exits the optical isolator.

In some embodiments, the substrate includes a semiconductor material, such as silicon.

Additionally or alternatively, the substrate includes a dielectric material.

In one embodiment, the recess has a closed bottom, and the optical isolator is mounted on the bottom of the recess.

In another embodiment, the device includes an optical interposer, wherein the recess passes through the substrate, and wherein both the substrate and the optical isolator are mounted on the optical interposer. In a disclosed embodiment, the optical interposer has an indentation, which is aligned with the recess in the substrate and in which the optical isolator is mounted.

There is also provided, in accordance with an embodiment of the invention, an optoelectronic device, including a substrate, having a recess formed therein. A bulk optical isolator, having input and output faces, is mounted in the recess. A first tapered waveguide is formed on the substrate and configured to direct a beam of radiation into the optical isolator through the input face. A second tapered waveguide is formed on the substrate and configured to receive and guide the beam of radiation from the output face of the optical isolator to a further photonic component.

In some embodiments, the first and second tapered waveguides include silicon nitride and are surrounded by one or more layers of silicon dioxide. In one embodiment, a portion of the one or more layers of silicon dioxide that is in proximity to the recess is surrounded by air.

There is additionally provided, in accordance with an embodiment of the invention, a method for manufacturing an optoelectronic device. The method includes forming a recess in a substrate and mounting an optical isolator in the recess. A stack of epitaxial layers is deposited on the substrate so as to define a laser, which is configured to emit a beam of radiation toward the recess along a direction parallel to a surface of the substrate. A waveguide is formed on the substrate so as to direct the beam emitted by the laser into the optical isolator.

The present invention will be more fully understood from the following detailed description of the embodiments thereof, taken together with the drawings in which:

BRIEF DESCRIPTION OF THE DRAWINGS

FIGS. 3A, B and C are schematic top, front, and rear views, respectively, of a tapered waveguide, in accordance with an embodiment of the invention;

FIGS. 4A, B and C are schematic top, front, and rear views, respectively, of a tapered waveguide, in accordance with another embodiment of the invention;

DETAILED DESCRIPTION OF EMBODIMENTS

Overview

Although laser integration has the potential to significantly simplify and reduce the cost of PIC products, to do so it cannot rely on interposer-based assembly, in which each one of the elements (PIC, laser, isolator) is pick-and-placed and manually aligned via series of lenses to decrease optical loss. This patent application describes an alternative architecture for optical isolator integration that can overcome these limitations.

The recent development of silicon PICs incorporating lasers has created new opportunities for development of a wide variety of miniature optoelectronic devices. Integration of optical isolators with the laser and other photonic components, however, remains a major challenge. The proposed solutions to this problem fall into two general categories:

Mounting a bulk Faraday isolator on or alongside the silicon chip. Because of the limited accuracy of mounting the isolator, devices that are known in the art use lenses to couple the laser beam (from a laser that is typically produced separately and mounted in place) into the isolator and out of the isolator into the PIC). In many cases, active alignment of the lenses is needed in order to compensate for deviations in the position and orientation of the isolator relative to the laser and PIC. Furthermore, the isolator, PIC and laser are commonly mounted on an interposer with limited precision, which further complicates the processing and increases the need for active lens alignment to minimize optical losses.

Integrated, waveguide-based optical isolators are typically formed by bonding or deposition of magneto-optical films and external magnets in close proximity to the photonic waveguide. This approach alleviates the problem of alignment, but suffers from high insertion loss of the films as compared to a single-crystal bulk isolator, as well as from high complexity, since integration of the magneto-optical material is incompatible with CMOS foundry processing and does not readily support the transverse-electric (TE) polarization of the laser.

The term "bulk" is used herein to refer to components that are separately manufactured and then placed on or alongside the PIC, as opposed to components that are fabricated as integral parts of the PIC. As noted above, bulk isolators typically comprise a single crystal of magneto-optic material and have roughly ten times less optical insertion loss than magneto-optic thin films, which are a few hundred nanometers thick and are grown on a lattice-mismatched substrate.

Bulk optical isolators, such as miniature Faraday isolators, thus remain the solution of choice because of their simplicity, low insertion loss (typically 0.5 dB or less), and strong isolation. Embodiments of the present invention provide device designs and methods for fabrication that alleviate the problems of integration and alignment of such bulk optical isolators with PICs. The present embodiments are capable of achieving the necessary accuracy of alignment without using any lens between the laser and the optical isolator, as well as between the optical isolator and the rest of the components of the PIC with which the laser is integrated, and without requiring any sort of active alignment notwithstanding the error inherent in mounting the isolator. In the disclosed embodiments, the only element that requires pick-and-place assembly (possibly with relaxed precision relative to devices that are known in the art) is the isolator, and possibly a PIC. No lens, laser placement, or active alignment is involved. The disclosed devices and methods of fabrication fully utilize the advantages of laser integration on a silicon-based PIC, thus enhancing yield and reducing product cost. Although the disclosed embodiments relate specifically to Faraday isolators, the principles of the present invention may similarly be applied using isolators of other types with suitable properties.

In some of the embodiments that are described herein, an optoelectronic device comprises a semiconductor substrate in which a recess is formed. In the disclosed embodiments, the substrate comprises silicon (which is the best-developed and lowest-cost PIC material currently available), but alternatively, other suitable semiconductor materials may be used. A PIC is fabricated on the substrate, including a laser, comprising a stack of epitaxial layers on the substrate, which emits a beam of radiation along a direction parallel to a surface of the substrate. An optical isolator, such as a bulk Faraday rotator, is mounted in the recess. A waveguide, which is fabricated as part of the PIC and has an entrance in proximity to the laser and an exit in proximity to the recess, directs the beam emitted by the laser into the optical isolator.

In other embodiments, the waveguides for directing the laser beam into and out of the optical isolator are formed on a dielectric substrate, such as fused silica. After deposition of the waveguides and overlying layers, a recess is etched through the dielectric substrate, and the isolator is mounted in this recess.

The embodiments described below use two types of waveguides: high-refractive-index waveguides, typically made of silicon, and low-refractive-index waveguides, made of silicon nitride or silicon oxynitride, for example. In these embodiments, the laser is coupled to a silicon waveguide, and many of the passive photonic components, such as other waveguides, splitters, couplers, filters, and interferometers, as well as active photonic components, such as thermal tuners, modulators, and detectors, can be implemented within or in conjunction with silicon waveguides. (Detectors commonly use a Si—Ge platform). For coupling to the isolator, however, low-refractive-index waveguides are desirable. Therefore, the propagation mode of the radiation emitted by the laser is transferred from the high-index (Si) waveguide (n=3.4) into the low-index (silicon nitride or silicon oxynitride) waveguide (n=2.0, 1.6) for input to the optical isolator, and vice versa following the optical isolator.

Typically, the low-index waveguides and high-index waveguides are fabricated in different layers within the stack of thin-film layers on the substrate, so that the low- and high-index waveguides are separated in the vertical direction. Waveguide couplers are used to carry out the transfer between the different waveguides, as shown in the figures that follow.

In some embodiments, the low-index waveguide is tapered along a direction of the beam between the entrance and the exit of the waveguide. By proper design of the taper, the width of the laser beam exiting the waveguide toward the input face of the optical isolator is expanded (relative to the width entering the waveguide), while the divergence of the laser beam is reduced. At the output from the optical isolator, a similar waveguide, typically with its taper direction reversed relative to the waveguide at the input side, can be used to receive and guide the beam toward further photonic components on the PIC. This arrangement of tapered waveguides, which can be aligned very precisely (to within less than 10 nm) using state-of-the-art lithographic techniques, substantially reduces the sensitivity of the device to misalignment of the optical isolator (as well as of the PIC when mounted on an interposer) and thus enables the beam to be coupled into and out of the optical isolator without the use of lenses or active alignment.

Typically, the recess is formed in the substrate using manufacturing techniques that are known in the art, such as etching or milling. In some embodiments, the recess penetrates only part way through the substrate and thus has a closed bottom, on which the optical isolator is mounted. In some cases, however, creating a recess of this sort of sufficient depth can be difficult. Therefore, in other embodiments, the recess passes through the semiconductor or dielectric substrate, and both the substrate (with the PIC formed on it) and the optical isolator are mounted on an optical interposer, which may have an indentation, aligned with the recess in the semiconductor substrate, in which the optical isolator is mounted.

Device Designs with Semiconductor Substrates

Figure 1A:
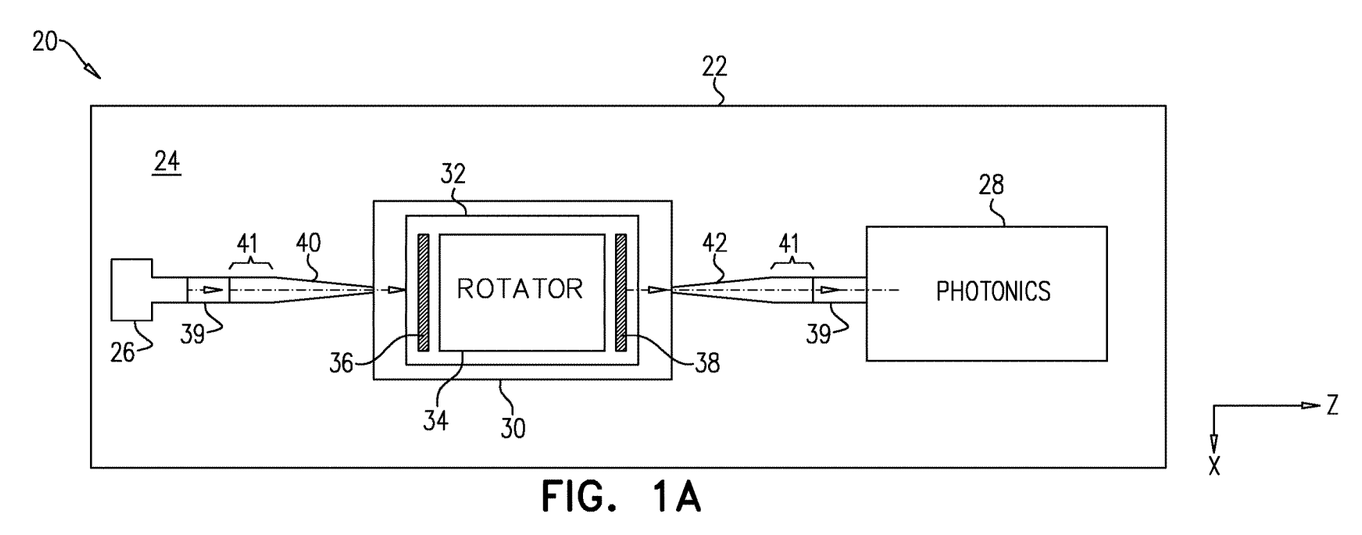
FIGS. 1A and 1B are schematic top and sectional views, respectively, of an optoelectronic device, in accordance with an embodiment of the invention.
Figure 1B:
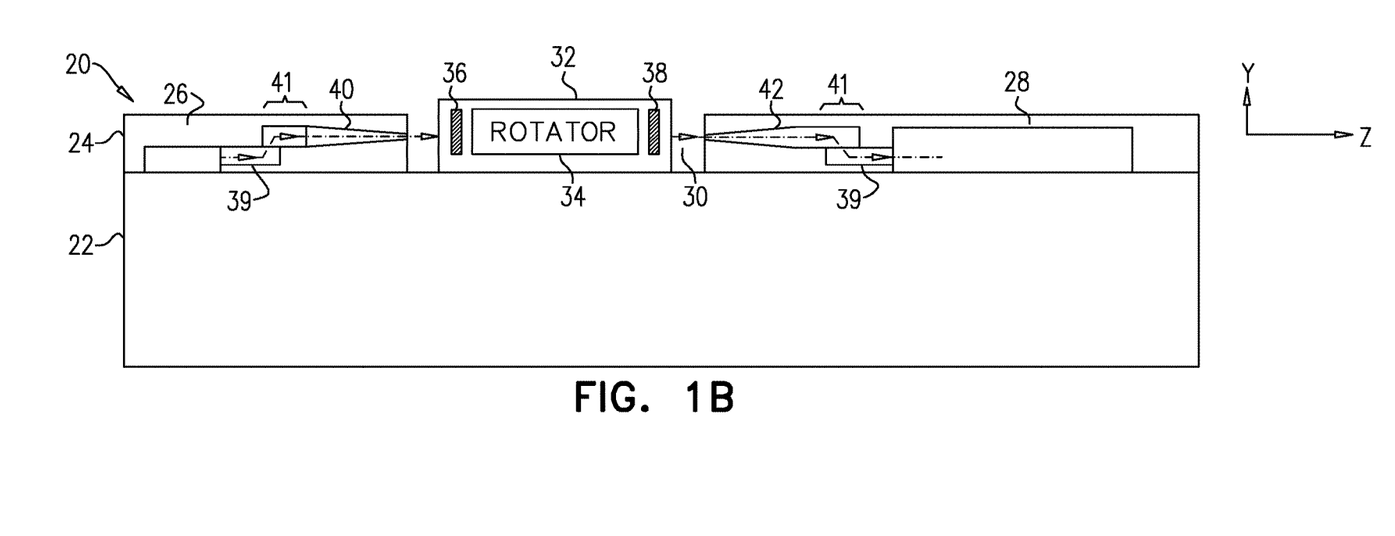

FIGS. 1A and 1B are schematic top and sectional views, respectively, of an optoelectronic device 20, in accordance with an embodiment of the invention. Coordinate axes are shown at the right side of the figures for ease of reference. The Z-axis is taken to be the longitudinal axis of device 20, running in the direction of the laser beam (as described below), while the X-axis runs transversely across the device. The X-Z plane, parallel to the upper surface of the device, is referred to, for the sake of convenience, as the horizontal plane. The Y-axis, perpendicular to the surface, is referred to as the vertical axis. The terms "horizontal" and "vertical" are used in this context solely for the sake of convenience, and device 20 may be operated in substantially any desired orientation.

Device 20 comprises a PIC, which is formed on a silicon substrate 22 (typically in the form of an SOI wafer). Photonic components are formed in a device layer 24 on substrate 22, including a laser 26 and further downstream components 28, including active and/or passive integrated components. Laser 26, which comprises a stack of epitaxial layers within device layer 24, emits a beam of radiation along the Z-direction toward a recess 30 that is formed in the substrate. Recess 30 is etched at least through device layer 24, typically to a depth of 0.4 mm to 1 mm.

An optical isolator 32 is mounted in recess 30, resting on the closed bottom of the recess. In this embodiment, optical isolator 32 is a Faraday isolator, comprising a bulk Faraday rotator 34, having an input polarizer 36 at its input face, positioned to receive the beam from laser 26, and an output polarizer 38 at its output face, with a direction of polarization that is rotated relative to the input polarizer. Faraday isolators of this sort, with dimensions on the order of a few millimeters or less, are available, for example, from II-VI Photonics, Inc. (Saxonburg, Pa.), and Deltronic Crystal Industries, Inc. (Dover, N.J.). Typically, output polarizer 38 is rotated by 45° relative to the input polarizer, as explained above. Consequently, isolator 32 will prevent any back-reflections, for example from downstream components 28, from returning to laser 26.

A waveguide 39 formed in device layer 24 guides the beam from laser 26 toward recess 30. The beam is directed into optical isolator 32 by a tapered waveguide 40, which is tapered along the Z-direction between the entrance and the exit of the waveguide. Typically, waveguide 39 comprises silicon, while waveguide 40 comprises a material with a low refractive index, such as a silicon nitride (for example $Si_3N_4$) or silicon oxynitride ($Si_2N_2O$). (The index is "low" by comparison with silicon, but higher than the surrounding $SiO_2$ in device layer 24.) In the pictured embodiment, waveguide 40 is formed in a higher level of the layer stack on substrate 22 than waveguide 39, and a coupler 41 transfers the beam from waveguide 39 to waveguide 40. Coupler 41 may comprise, for example, a segment of waveguide 39 that tapers along the Z-direction, overlaid by a segment of waveguide 40 with the opposite taper, as is known in the art, so that the laser mode is transferred from waveguide 39 to waveguide 40.

In the present example, the exit of waveguide 40, at recess 30, is smaller than the entrance and has a transverse dimension that is less than the wavelength of the radiation emitted by laser 26. As shown in the figures, it is desirable that waveguide 40 be tapered in both the horizontal (X) dimension and in the vertical (Y) dimension. Details of this design are described further herein below with reference to FIGS. 3A-C.

By proper design of waveguide 40, with a minimal exit dimension, it is possible to expand the spot size of the laser beam from about one or a few microns at the exit from laser 26 to several tens of microns at the entrance to optical isolator 32. In the pictured embodiment, a further tapered waveguide 42, with its taper direction reversed relative to waveguide 40, narrows and guides the beam from the output of optical isolator 32 toward downstream components 28. (Alternatively, other means, as are known in the art, may be used in coupling the optical radiation out of optical isolator 32, depending on the requirements of the optical circuit.) This degree of taper mode expansion is sufficient to compensate for the expansion of the beam propagating in recess 30 and optical isolator 32. Note that small displacements and/or rotations of optical isolator 32 within recess 30 will not affect the isolation performance beyond a small loss of optical power in addition to the insertion loss of the optical isolator itself.

Typically (although not necessarily), laser 26 emits a beam with horizontal (X-direction) polarization, which is guided toward recess 30 through waveguide 39 in a transverse electric (TE) mode (aligned along the X-direction). Following rotation of the polarization by optical isolator 32, however, the beam will be polarized at a 45° angle relative to substrate 22 and will include both TE and TM (transverse magnetic) components in the downstream waveguide. This rotation can result in a loss of 3 dB in optical power due to leakage of the TM components into the substrate. To reduce this power loss, an additional polarization rotator (not shown) can be introduced following output polarizer 38, to restore the horizontal polarization of the beam. Alternatively, optical isolator 32 may comprise a two-stage isolator, which outputs a beam with the same (horizontal) polarization as the input beam.

As a further alternative (not shown in the figures), the recess in substrate may be formed as a trench, for example by anisotropic etching in silicon, with sloping sides tilted by approximately 45° relative to the horizontal plane. Optical isolator 32 is mounted in the trench with a corresponding 45° rotation relative to the horizontal plane. The angles of rotation of polarizers 36 and 38 are adjusted accordingly.

Figure 2A:
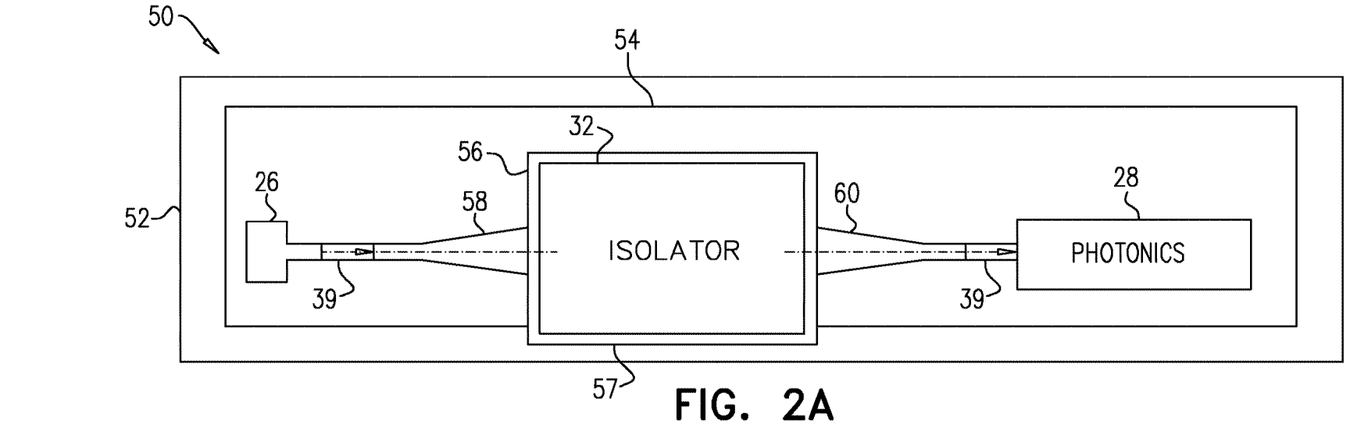
FIGS. 2A and 2B are schematic top and sectional views, respectively, of an optoelectronic device, in accordance with another embodiment of the invention.
Figure 2B:
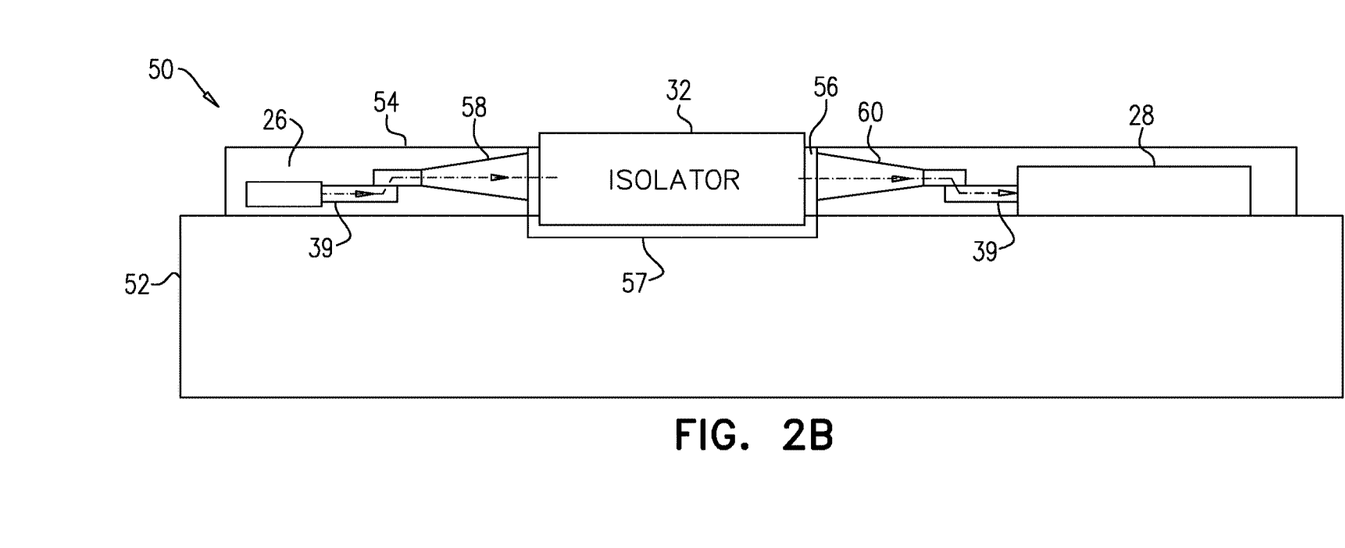

FIGS. 2A and 2B are schematic top and sectional views, respectively, of an optoelectronic device 50, in accordance with another embodiment of the invention. Device 50 operates on principles similar to those of device 20, as described above, and components having similar functions in device 50 to those in device 20 are labeled with the same indicator numbers.

In contrast to device 20, device 50 comprises an optical interposer 52, i.e., an additional substrate of sufficient size and surface quality to allow the other elements of device 50 to be mounted on it. Interposer 52 may comprise any suitable material, such as silicon or glass, for example. All optoelectronic components of device 50, with the exception of optical isolator 32, are formed on a PIC substrate 54, comprising a suitable semiconductor material. Substrate 54 may comprise, for example, the upper silicon device layer of an SOI wafer; in this case, after fabrication of the optoelectronic components on the SOI, the lower silicon handling wafer is typically removed before bonding substrate 54 to interposer 52.

A recess 56 in substrate 54 passes through the entire vertical thickness of the substrate, and optical isolator is thus mounted within recess 56 on interposer 52. Depending on the height of optical isolator 32 relative to the thickness of substrate 54, an indentation 57 may be formed in interposer 52 and aligned with recess 56 to accommodate the interposer. Recess 56 may enclose isolator on all sides (as does recess 30 in FIG. 1A); but alternatively, for ease of fabrication, recess 56 may be open on one side, as shown in FIG. 2A.

A tapered waveguide 58 directs the beam from laser 26 into optical isolator 32 while expanding the spot size of the laser beam. The direction of taper of waveguide 58, however, is opposite to that of waveguide 40 (FIGS. 1A/B): The transverse dimension of waveguide 58 widens adiabatically from the entrance of the waveguide, in proximity to laser 26, to the exit from the waveguide at recess 56. A further tapered waveguide 60, with its taper direction reversed relative to waveguide 40, narrows adiabatically from the output of optical isolator 32 toward downstream components 28. Details of these waveguides are described further hereinbelow with reference to FIGS. 4A-C.

In alternative embodiments, waveguides 58 and 60 can be used in a device without an interposer, such as device 20, and waveguides 40 and 42 can be used in a device with an interposer, such as device 50. Furthermore, although FIGS. 1A/B and 2A/B show certain specific devices and component layouts for the sake of concreteness and clarity, the principles of the present invention, in terms of the use of waveguides to direct optical radiation into and out of an optical isolator, may similarly be applied in other devices and layouts. For example, optical isolators can be introduced, using waveguides in the manner described above, not only at the output from the laser, but also between other elements in a PIC or between the output of a PIC and an external fiber coupler in order to prevent back-reflections within the PIC or from external devices. All such alternative implementations are considered to be within the scope of the present invention.

Waveguide Details

Figure 3:
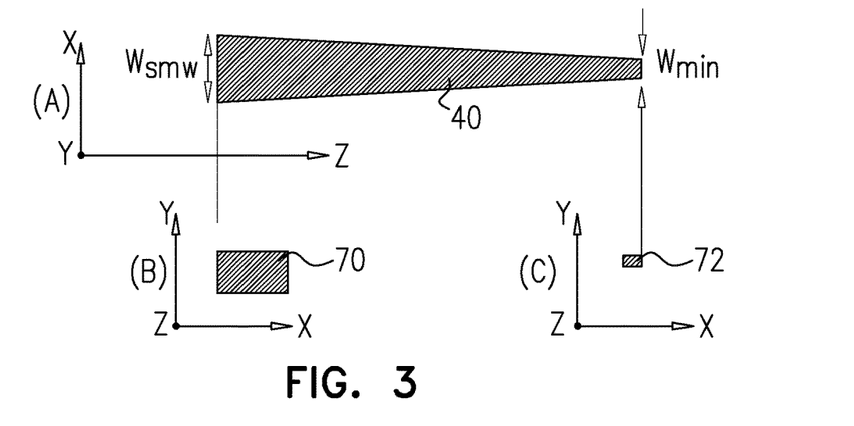

FIGS. 3A, B and C are schematic top, front, and rear views, respectively, of tapered waveguide 40, in accordance with an embodiment of the invention. FIG. 3B shows an entrance 70 to the waveguide (at the left in FIGS. 1A/B), while FIG. 3C shows an exit 72 from the waveguide (in proximity to the optical isolator). As noted earlier, waveguide 40 typically comprises a low-index material (relative to silicon), such as silicon nitride or silicon oxynitride. The refractive index may be reduced still further, if necessary, by patterning waveguide 40 with a sub-micron grating structure, as is known in the art.

Entrance 70 has a width $W_{SMW}$ that is chosen to receive and guide single-mode TE radiation, as output by laser 26 (through waveguide 39). (As noted earlier, laser 26, waveguide 39, and other components on the PIC are formed in the silicon device layer on the SOI wafer. To couple the mode from waveguide 39 into waveguide 40 and out of waveguide 42, couplers 41 can be used, as described above.) Waveguide 40 tapers down to a minimum width $W_{MIN}$ at exit 72, which is typically the smallest width that can be produced using the applicable lithographic technology, currently approximately 50 nm for silicon PICs. It is desirable, as illustrated in the figures, that waveguide 40 taper in both the vertical and horizontal dimensions, so that at the end of the waveguide, the laser beam reaches the maximal achievable mode size with minimal astigmatism between the X and Y axis. Waveguide 42 has similar dimensions, but reversed along the Z-axis relative to waveguide 40.

Figure 4:
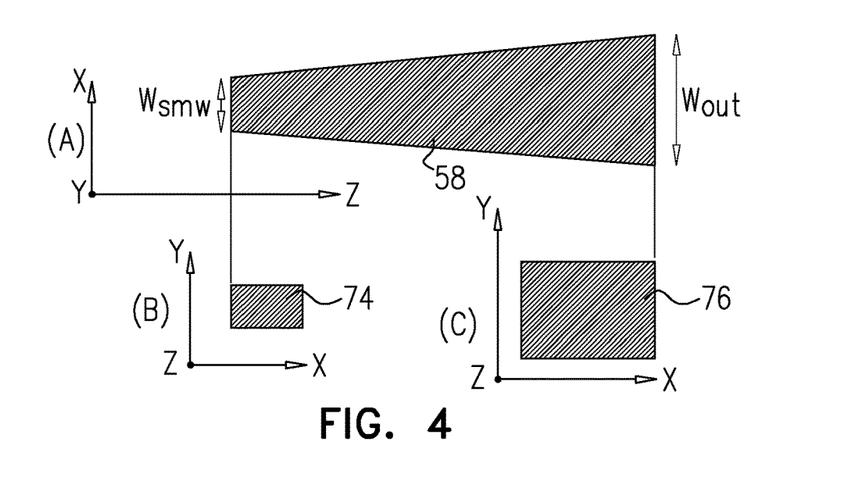

FIGS. 4A, B and C are schematic top, front, and rear views, respectively, of tapered waveguide 58, in accordance with another embodiment of the invention. As in the preceding embodiment, an entrance 74 of waveguide 58, shown in FIG. 4B, has the width $W_{SMW}$ needed to receive single-mode TE radiation from laser 26. Waveguide 58 widens adiabatically to an exit 76, shown in FIG. 4C, with an output width $W_{OUT}$ that is typically several tens of microns, as described above. Because the taper is adiabatic, the radiation propagates through the entire waveguide in the same TE mode in which it entered (typically the lowest mode, TE0), without substantial reflection or energy transfer into a higher order-modes, thus exhibiting low optical loss. Any linear change in the width of the waveguide over a sufficiently long taper length can achieve the desired adiabatic behavior. Thus, for example, at a wavelength of 1.31 µm in silicon nitride (n=2.0), the wavelength in the material is 0.65 µm, and a taper that is over a hundred microns long with a linear variation of width will satisfy the requirements for adiabaticity. As a result, the TE0 mode will be preserved with very small propagation loss, typically governed by the scattering. In one embodiment, a sub-linear increase of the width is used to decrease the loss even further.

Waveguides 40, 42, 58 and 60 can be produced by successive deposition and etching of multiple layers of the waveguide material. Producing structures of this sort with smooth vertical gradations, however, can be difficult. Alternative schemes that may be easier to implement are shown in the figures that follow.

Figure 5:
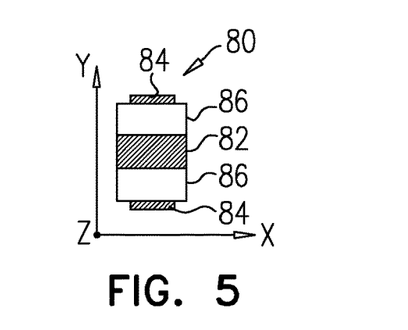
FIG. 5 is a schematic sectional view of a tapered multi-layer waveguide, in accordance with an alternative embodiment of the invention.

FIG. 5 is a schematic sectional view of a tapered waveguide 80, in accordance with an alternative embodiment of the invention. Waveguide 80 comprises a central layer 82 and upper and lower layers 84 of a guiding material, such as silicon nitride or silicon oxynitride. Layers 82 and 84 are separated by intermediate layers 86 of a lower-index material, such as silicon dioxide. The horizontal widths of layers 82 and 84 are tapered in the longitudinal (Z) direction, increasing from left to right in the view shown in FIG. 4A. In addition, upper and lower layers 84 may be present only near the wide (right) end of the waveguide and removed entirely from the narrower (left) end.

This multi-layer structure (which may alternatively comprise more than three guiding layers) is designed to provide spherical mode expansion in the X-Y plane, which facilitates mode coupling to the zero-order Gaussian beam for free-space propagation in the recess and isolator. As a result, no astigmatism correction is needed at the receiving taper end, i.e., waveguide 42 or 60, thus simplifying taper design and manufacturability.

Figure 6A:
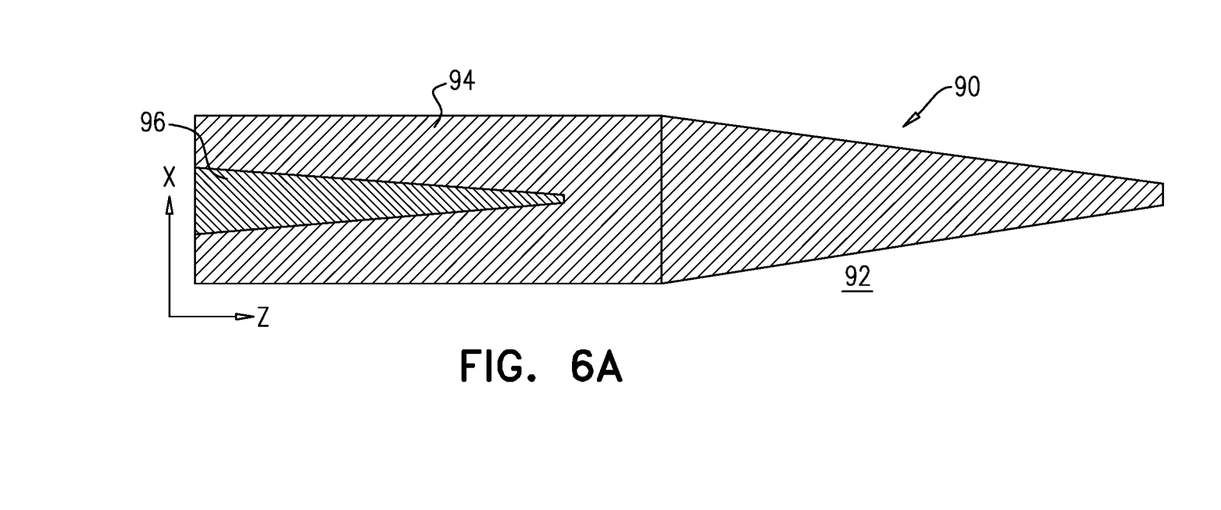
FIGS. 6A and 6B are schematic top and front views, respectively, of a tapered waveguide, in accordance with yet another embodiment of the invention.
Figure 6B:
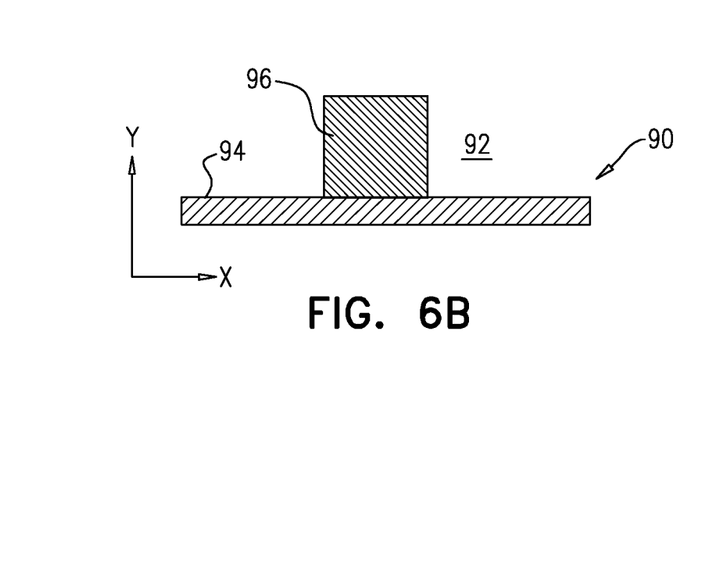

FIGS. 6A and 6B are schematic top and front views, respectively, of a tapered waveguide 90, in accordance with yet another embodiment of the invention. The "ridge" configuration of waveguide 90 is useful in permitting gradual variation of the layer thickness (in the Y-direction) and width (in the X-direction) independently, and may also be advantageous in terms of reducing leakage to the substrate and supporting TM polarization.

Waveguide 90 comprises a base layer 94, with an overlying ridge layer 96. As in the preceding embodiments, layers 94 and 96 comprise silicon nitride, silicon oxynitride, or another suitable material of similar refractive index. Layers 94 and 96 are supported and surrounded by a lower-index material 92, such as silicon dioxide. To achieve the desired guiding performance, base layer 94 can be about 100 nm thick in the vertical direction, and tapers horizontally to a width of about 100 nm at the narrow end of waveguide 90, at the right side of FIG. 6A. Ridge layer 96 can be about 450 nm thick in the vertical direction and similarly tapers in width over the wider (left) part of the waveguide, to a point midway along the length of the waveguide.

Alternative types of tapered waveguides that can be used in this context will be apparent to those skilled in the art after reading the present description and are considered to be within the scope of the present invention.

Device Designs with Dielectric Substrate

In an alternative embodiment of the present invention, which is illustrated in the figures that follow, the tapered waveguides for coupling light into and out of the isolator are formed on a dielectric substrate, rather than on a silicon substrate as described above. This approach is advantageous in achieving good coupling into and out of the low-index waveguides and ease of manufacture. Using this approach, the tapered waveguides may comprise a thin nitride layer, such as silicon nitride or silicon oxynitride, for example, surrounded by thick oxide layers above and below, with a thin oxide membrane (about 15 µm thick, for instance) at the edges of the waveguides facing the isolator, or free-standing thin nitride couplers with supporting ribs. The other components of the PIC are omitted from the figures that follow for the sake of simplicity; but they may similarly be formed by depositing suitable semiconductor and metal layers on the dielectric substrate.

Figure 7A:
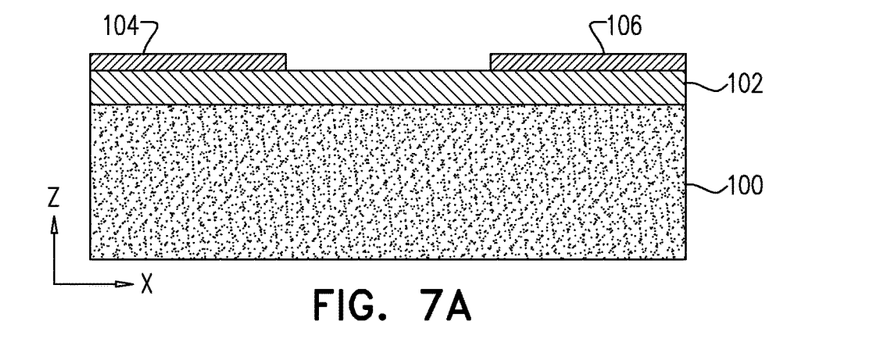
FIGS. 7A and 7B are schematic sectional and top views, respectively, of tapered waveguides formed on a substrate, in accordance with an embodiment of the invention.
Figure 7B:
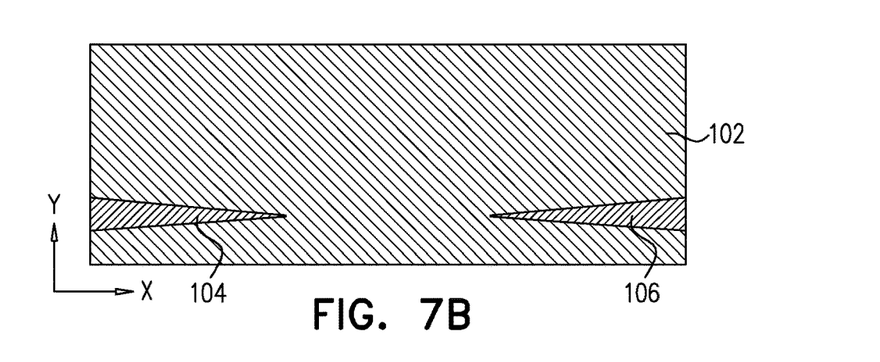

FIGS. 7A and 7B are schematic sectional and top views, respectively, of tapered waveguides 104 and 106 formed on a dielectric substrate 100, in accordance with an embodiment of the invention. Substrate 100 comprises fused silica, for example, with a thick layer 102 (for example, about 1 µm thick) of $SiO_2$ deposited on the substrate. A thin layer of SiN is deposited over $SiO_2$ layer 102, and is then etched to form tapered waveguides 104, for example by a suitable photolithographic process, as is known in the art. The outer portions of waveguides 104 and 106, to the left and right of the part of the device that is shown in these figures, may be coupled in the manner described above to high-index waveguides, such as silicon waveguides, which are formed over substrate 100 in other layers, adjacent to the SiN layer.

Figure 8:
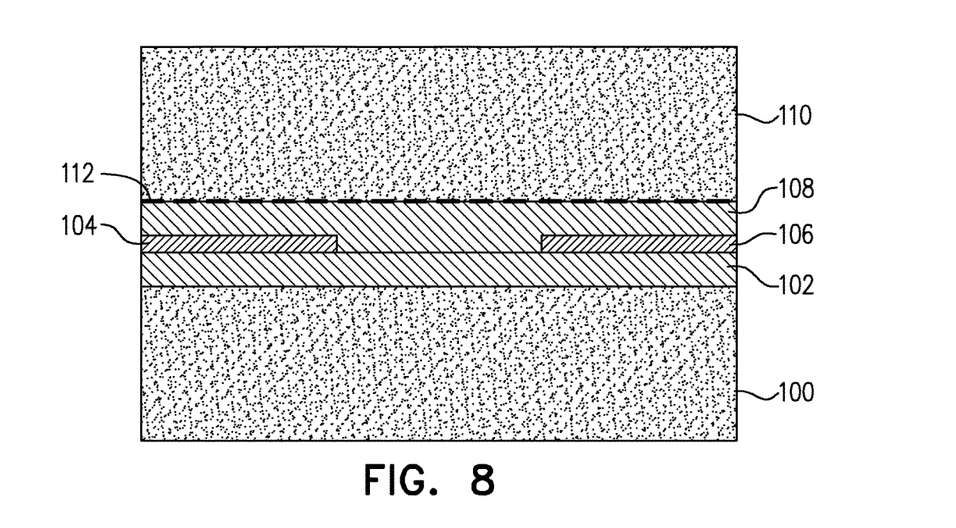
FIGS. 8-10 are schematic sectional views of the tapered waveguides of FIG. 7A, showing successive steps in preparation for insertion of an optical isolator in a recess between the waveguides, in accordance with an embodiment of the invention.
Figure 9:
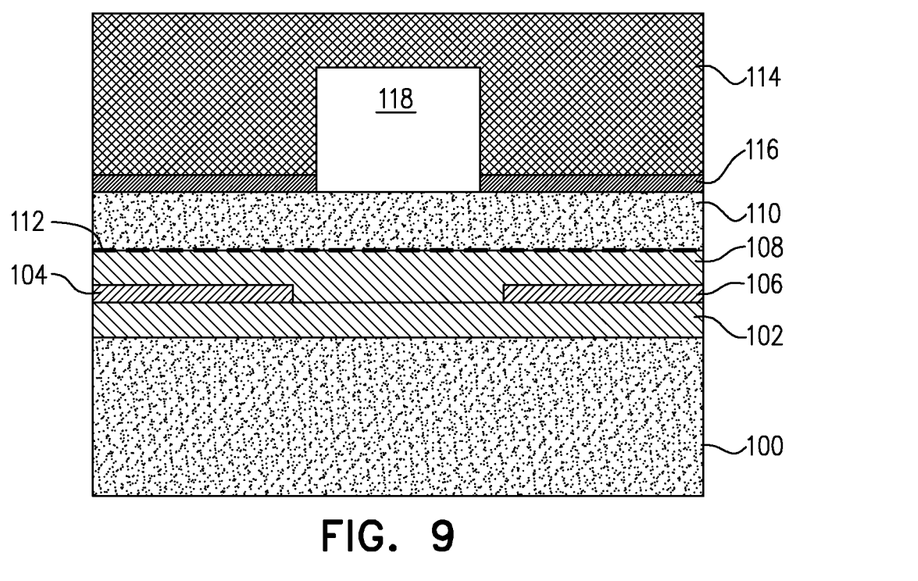
Figure 10:
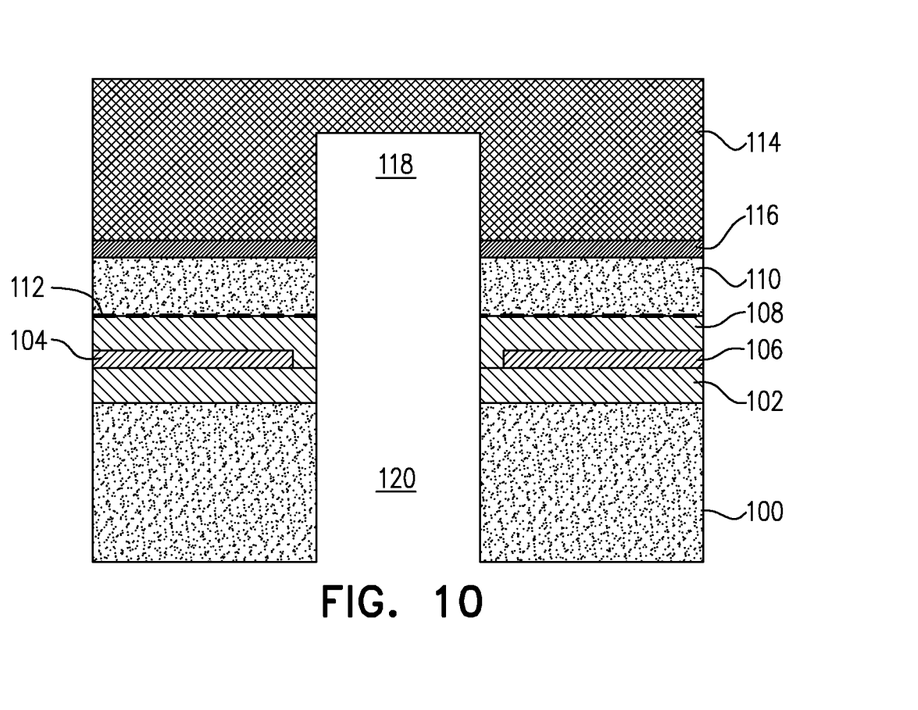

FIGS. 8-10 are schematic sectional views, showing successive processing steps in preparation for insertion of an optical isolator in a recess between waveguides 104 and 106, in accordance with an embodiment of the invention. As shown in FIG. 8, an additional thick layer 108 of $SiO_2$ (again, about 1 µm thick) is deposited over waveguides 104 and 106. An additional dielectric wafer 110, for example, a wafer of fused silica about 700 µm thick, is then bonded over layer 108. For this purpose, the upper surface of layer 108 may be polished, using chemical-mechanical polishing (CMP), for instance, and then bonded to wafer 110 by an oxide bond 112.

As illustrated in FIG. 9, the upper side of wafer 110 is thinned, typically to a thickness of 100 µm or less, again using CMP. Wafer 110 is then bonded to an interposer 114, comprising silicon, for example, by a polymer bond 116, such as a suitable epoxy. A recess 118 is pre-formed in interposer 114 to accommodate the isolator.

Next, as illustrated in FIG. 10, the lower side of substrate 100 is thinned, as well, similarly by CMP to 100 µm or less. A recess 120, in alignment with recess 118, is then etched all the way through the dielectric layers, including both substrate 100, wafer 110, and the intervening oxide layers 102 and 108. Deep reactive-ion etching (DRIE) may be used for this purpose, leaving a thin section of SiO$_2$ from layer 108 between the ends of waveguides 104 and 106 and recess 120.

Figure 11A:
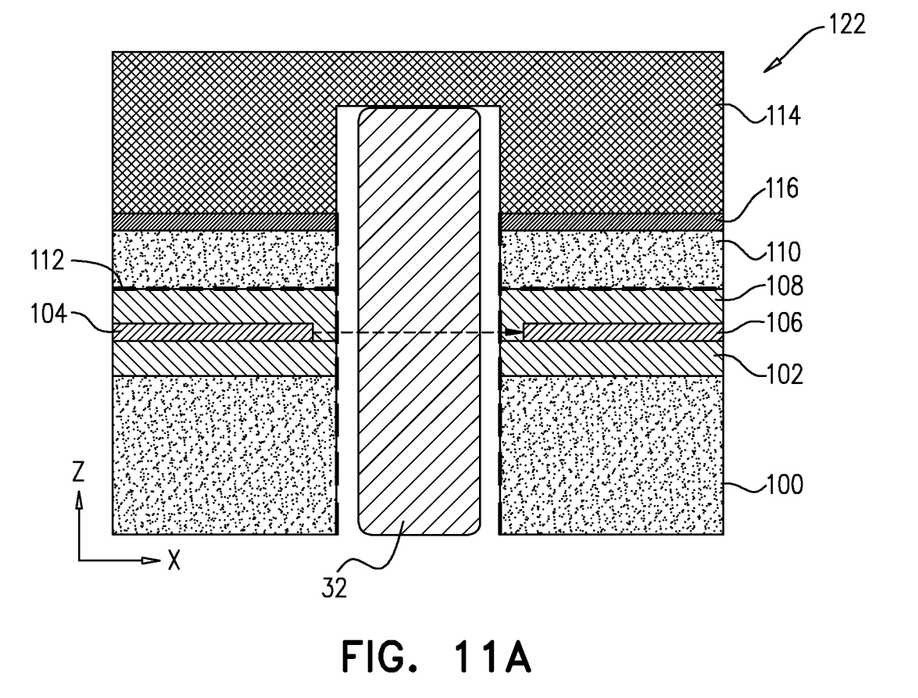
FIGS. 11A and 11B are schematic sectional views, in vertical and horizontal planes, respectively, of an optoelectronic device comprising an optical isolator in a recess between tapered waveguides, in accordance with an embodiment of the invention.
Figure 11B:
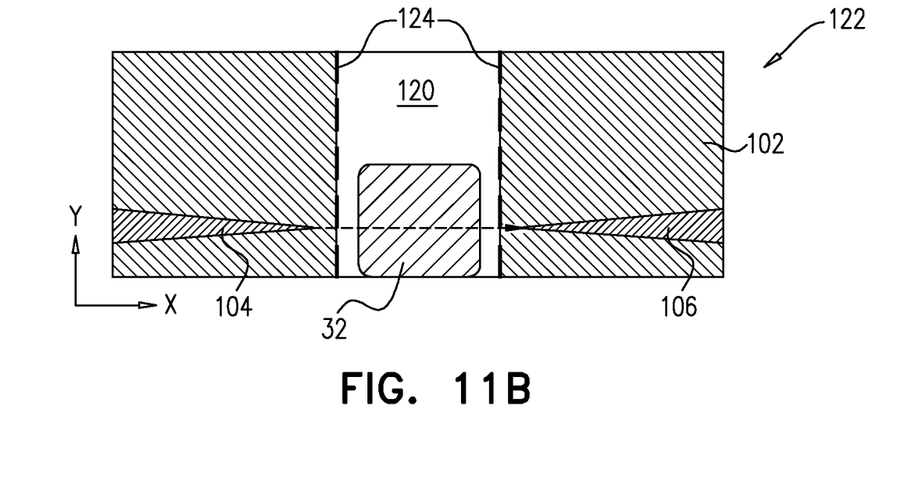

FIGS. 11A and 11B are schematic sectional views, in vertical and horizontal planes, respectively, showing the final steps in production of an optoelectronic device 122, in accordance with an embodiment of the invention, following the process illustrated in the preceding figures. Inner sidewalls 124 of recess 120 may be polished before insertion of the isolator in order to reduce light scattering. Isolator 32 is then inserted within recesses 120 and 118 and mounted on interposer 114. Waveguide 104 guides light into isolator 32, and waveguide 106 then collects and transmits the light that has passed through the isolator, in the manner described above.

Figure 12A:
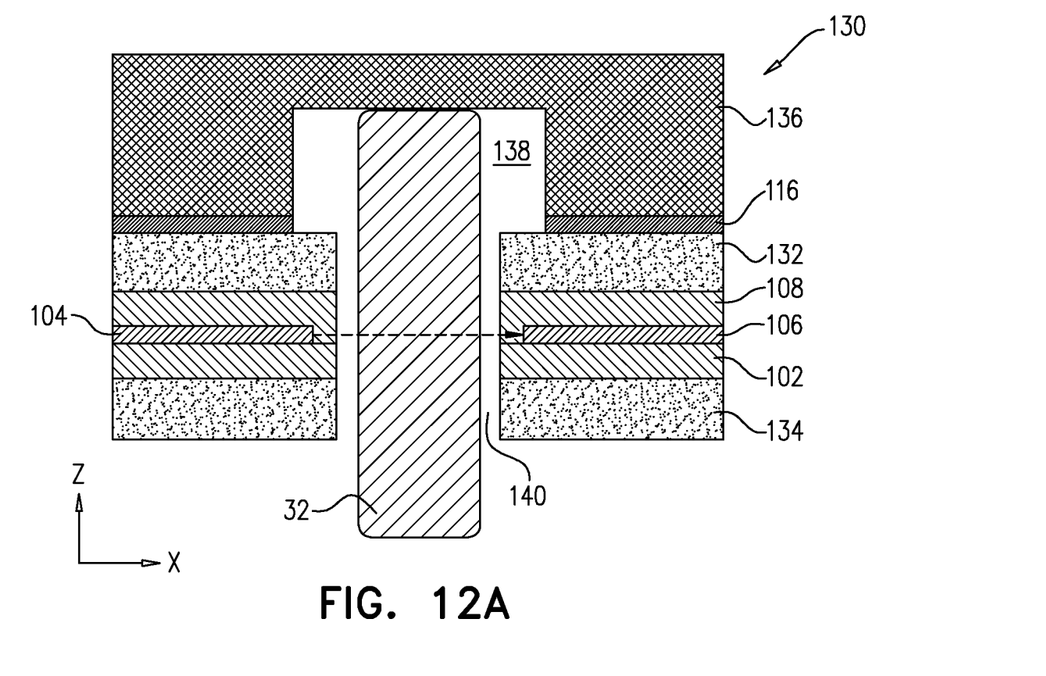
FIGS. 12A and 12B are schematic sectional views, in vertical and horizontal planes, respectively, of an optoelectronic device comprising an optical isolator in a recess between tapered waveguides, in accordance with an embodiment of the invention.
Figure 12B:
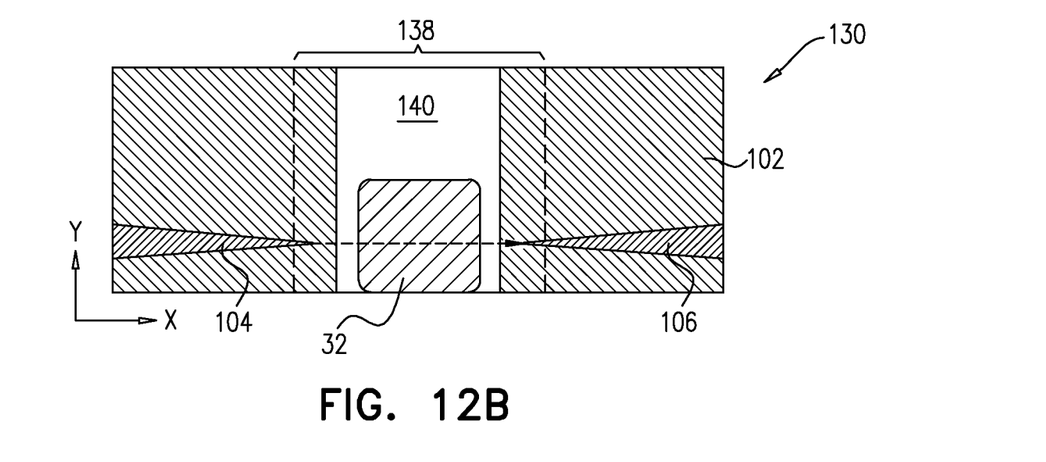

FIGS. 12A and 12B are schematic sectional views, in vertical and horizontal planes, respectively, showing an optoelectronic device 130, in accordance with another embodiment of the invention. Device 130 is similar to device 122, as described above, and components of device 130 that with the same structure and functionality as the corresponding components of device 122 are labeled with the same indicator numbers. Device 130 differs from device 122, however, in that portions of the layers of SiO$_2$ that are in proximity to a central recess 140, which contains isolator 32, are surrounded by air.

The reason for this difference is as follows: The thickness of wafer 110 in device 122 (roughly 100 μm) can create difficulties in coupling SiN waveguides 104 and 106 to silicon waveguides 39, because of the large vertical separation between the silicon and SiN layers. Furthermore, it can be difficult to connect the thick SiO$_2$ die to a much thinner silicon photonics die, which is typically no more than 8-15 μm thick.

To alleviate these difficulties, thin cladding layers 132 and 134 of SiO$_2$ (for example, 14 μm thick) are deposited above and below oxide layers 102 and 108. To support the large mode produced by SiN waveguide 104, without significant mode decay and loss into the interposer 136, the portions of layers 132 and 134 that are in proximity to recess 140 are surrounded symmetrically by air cladding above and below recess 140. To provide the desired air cladding above layer 132, an interposer 136 is used, with a recess 138 that is wider in the X-direction than recess 140, and thus wider than the distance between the ends of SiN waveguides 104 and 106. In effect, the large recess 138 creates an undercut of more than 200 μm beneath cladding layer 132.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. An optoelectronic device, comprising:
   a substrate, having a device layer thereon and having a recess formed therein and extending at least through the device layer;
   an optical isolator mounted in the recess and comprising an input face and an output face;
   a laser comprising a stack of epitaxial layers on the substrate and configured to emit a beam of radiation toward the recess along a direction parallel to a surface of the substrate; and
   a waveguide formed in the device layer and configured to direct the beam emitted by the laser toward the recess and into the input face of the optical isolator.

2. The device according to claim 1, wherein the waveguide has an entrance in proximity to the laser and an exit in proximity to the recess and is tapered along a direction of the beam between the entrance and the exit.

3. The device according to claim 2, wherein the exit of the waveguide is smaller than the entrance and has a transverse dimension that is less than a wavelength of the radiation emitted by the laser.

4. The device according to claim 2, wherein a transverse dimension of the waveguide widens adiabatically from the entrance to the exit.

5. The device according to claim 2, wherein the waveguide is tapered in both a horizontal dimension, parallel to the surface of the substrate, and in a vertical dimension, perpendicular to the surface of the substrate.

6. The device according to claim 1, wherein there is no lens between the laser and the optical isolator.

7. The device according to claim 1, wherein the input face of the optical isolator is positioned to receive the beam from the waveguide, and the beam exits the optical isolator through the output face, and wherein the device comprises one or more further photonic components on the substrate and a further waveguide configured to guide the beam from the output face of the optical isolator toward the one or more further photonic components.

8. The device according to claim 7, wherein there is no lens between the optical isolator and the further photonic components.

9. The device according to claim 1, wherein the optical isolator comprises a bulk Faraday rotator.

10. The device according to claim 9, wherein the optical isolator comprises an input polarizer positioned to receive the beam from the waveguide, and an output polarizer, which has a direction of polarization that is rotated relative to the input polarizer and through which the beam exits the optical isolator.

11. The device according to claim 1, wherein the substrate comprises a semiconductor material.

12. The device according to claim 11, wherein the semiconductor material comprises silicon.

13. The device according to claim 1, wherein the substrate comprises a dielectric material.

14. The device according to claim 1, wherein the recess has a closed bottom, and the optical isolator is mounted on the bottom of the recess.

15. The device according to claim 1, and comprising an optical interposer, wherein the recess passes through the substrate, and wherein both the substrate and the optical isolator are mounted on the optical interposer.

16. The device according to claim 15, wherein the optical interposer has an indentation, which is aligned with the recess in the substrate and in which the optical isolator is mounted.

17. An optoelectronic device, comprising:
   a substrate, having a recess formed therein;
   a bulk optical isolator, comprising a single crystal of a magneto-optic material, having input and output faces, mounted in the recess;

a first tapered waveguide formed on the substrate and configured to direct a beam of radiation into the optical isolator through the input face; and a second tapered waveguide formed on the substrate and configured to receive and guide the beam of radiation from the output face of the optical isolator to a further photonic component.

18. The device according to claim 17, wherein the first and second tapered waveguides comprise silicon nitride and are surrounded by one or more layers of silicon dioxide.

19. The device according to claim 18, wherein a portion of the one or more layers of silicon dioxide that is in proximity to the recess is surrounded by air.

20. A method for manufacturing an optoelectronic device, the method comprising:

forming a recess in a substrate having a device layer thereon such that the recess extends at least through the device layer;

mounting an optical isolator, having an input face and an output face, in the recess;

depositing a stack of epitaxial layers on the substrate so as to define a laser, which is configured to emit a beam of radiation toward the recess along a direction parallel to a surface of the substrate; and forming a waveguide in the device layer on the substrate so as to direct the beam emitted by the laser toward the recess and into the input face of the optical isolator.

* * * * *